United States Patent
Kamhi et al.

(10) Patent No.: US 9,152,440 B2
(45) Date of Patent: Oct. 6, 2015

(54) USER EVENTS/BEHAVIORS AND PERCEPTUAL COMPUTING SYSTEM EMULATION

(75) Inventors: Gila Kamhi, Zichron Yaakov (IL); Amit Moran, Tel Aviv (IL); Limor David, Haifa (IL); Yoni Aizik, Haifa (IL)

(73) Assignee: Intel Corporation, Santa Clara, CA (US)

( * ) Notice: Subject to any disclaimer, the term of this patent is extended or adjusted under 35 U.S.C. 154(b) by 346 days.

(21) Appl. No.: 13/534,713

(22) Filed: Jun. 27, 2012

(65) Prior Publication Data

US 2014/0006001 A1 Jan. 2, 2014

(51) Int. Cl.
*G06F 9/455* (2006.01)
*G06F 11/34* (2006.01)

(52) U.S. Cl.
CPC ............ *G06F 9/455* (2013.01); *G06F 11/3414* (2013.01); *G06F 11/3461* (2013.01)

(58) Field of Classification Search
CPC ....... G06F 9/44; G06F 3/017; G06F 3/04883; G06F 17/3089; G06F 17/30899; G06F 11/3438; G06F 11/3495; G06F 11/3476; G06N 7/005; G06N 5/00; G06N 5/02; G06T 11/20; G06K 9/00348
USPC ......................................................... 703/23
See application file for complete search history.

(56) References Cited

U.S. PATENT DOCUMENTS

| 7,203,667 | B2 * | 4/2007 | Higgins et al. ................... 706/45 |
| 7,822,755 | B2 * | 10/2010 | Barua et al. .................... 707/755 |
| 7,877,706 | B2 * | 1/2011 | Albertson et al. ............. 715/863 |
| 8,266,091 | B1 * | 9/2012 | Gubin et al. .................... 706/52 |
| 2005/0132378 | A1 * | 6/2005 | Horvitz et al. ................. 718/104 |
| 2006/0210112 | A1 * | 9/2006 | Cohen et al. ................... 382/103 |
| 2008/0040692 | A1 * | 2/2008 | Sunday et al. ................. 715/863 |
| 2009/0271514 | A1 * | 10/2009 | Thomas et al. ................ 709/224 |
| 2011/0234543 | A1 * | 9/2011 | Gardenfors et al. ........... 345/175 |
| 2013/0300744 | A1 * | 11/2013 | Fulton et al. .................. 345/440 |

FOREIGN PATENT DOCUMENTS

EP 2204760 A1 7/2010

OTHER PUBLICATIONS

Koons et al. (Integrating Simultaneous Input from Speech, Gaze and Hand Gestures: Morgan Kaufmann Publishers Inc., 1998, pp. 257-276).*

Perakakis et al. ("A Study in Efficiency and Modality Usage in Multimodal Form Filling Systems", IEEE, 2008, pp. 1194-1206).*

(Continued)

*Primary Examiner* — Omar Fernandez Rivas
*Assistant Examiner* — Iftekhar Khan
(74) *Attorney, Agent, or Firm* — Schwabe, Williamson & Wyatt, P.C.

(57) ABSTRACT

Methods, apparatuses and storage medium associated with engineering perceptual computing systems that includes user intent modeling are disclosed herewith. In embodiments, one or more storage medium may include instructions configured to enable a computing device to receive a usage model having a plurality of user event/behavior statistics, and to generate a plurality of traces of user events/behaviors over a period of time to form a workload. The generation may be based at least in part on the user event/behavior statistics. The workload may be for input into an emulator configured to emulate a perceptual computing system. Other embodiments may be disclosed or claimed.

19 Claims, 4 Drawing Sheets

(56) References Cited

OTHER PUBLICATIONS

Velik et al. (Emulating the Perceptual System of the Brain for the Purpose of Sensor Fusion, 2008, IEEE).*

International Search Report and Written Opinion mailed Aug. 23, 2013 for International Application No. PCT/US2013/043043, 10 pages.
International Preliminary Report on Patentability mailed Jan. 8, 2015 for International Application No. PCT/US2013/043043, 7 pages.

* cited by examiner

Non-transitory computer-readable storage medium
402

Programming Instructions 404
configured to cause a device, in response to execution of the programming instructions, to practice (aspects of) embodiments of the method of Figure 2.

Figure 4

USER EVENTS/BEHAVIORS AND PERCEPTUAL COMPUTING SYSTEM EMULATION

TECHNICAL FIELD

This application relates to the technical field of data processing, more specifically to methods and apparatuses associated with user events/behaviors and perceptual computing system emulation.

TECHNICAL FIELD

The background description provided herein is for the purpose of generally presenting the context of the disclosure. Unless otherwise indicated herein, the materials described in this section are not prior art to the claims in this application and are not admitted to be prior art by inclusion in this section.

With continuing advances in integrated circuits and computing technology, perceptual computing has gained popularity in recent years. However, to-date, there is no systematic way to assess and evaluate performance of perceptual computing systems while the systems are being designed/engineered.

BRIEF DESCRIPTION OF THE DRAWINGS

Embodiments of the present invention will be described by way of exemplary embodiments, but not limitations, illustrated in the accompanying drawings in which like references denote similar elements, and in which:

FIG. 4 illustrates an example non-transitory computer-readable storage medium having instructions configured to practice all or selected aspects of the method of FIG. 2; all arranged in accordance with embodiments of the present disclosure.

DETAILED DESCRIPTION

Figure 1:
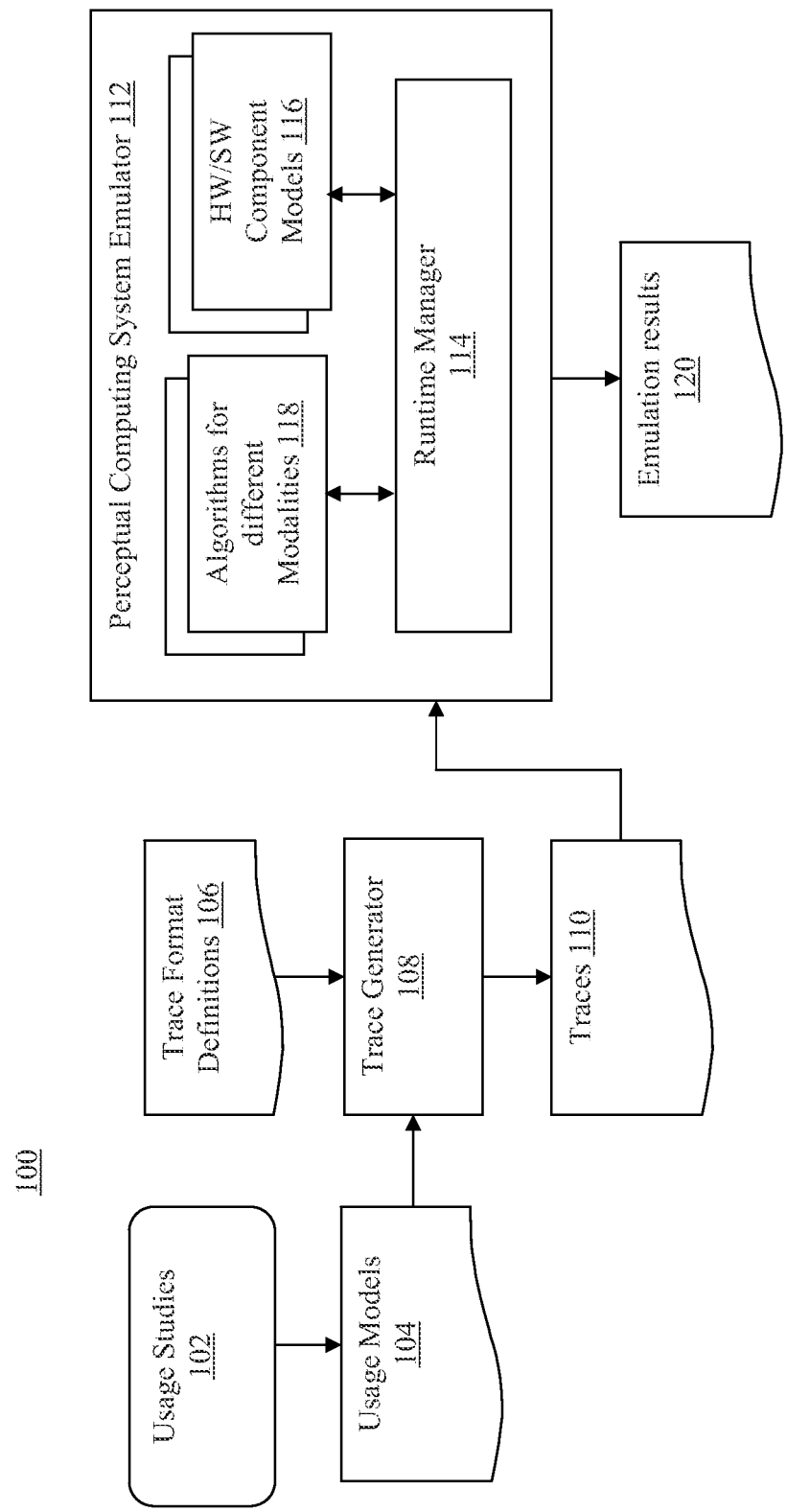
FIG. 1 illustrates an overview of an arrangement associated with designing/engineering perceptual computing systems that includes user intent modeling.

Methods, apparatuses and storage medium associated with designing/engineering perceptual computing systems that includes user intent modeling are disclosed herewith. In various embodiments, a formal approach to model user behavior/intent and interactions with computer is provided. The models enable emulation of perceptual computing usage, using traces, in particular, prior to the implementation/development of the entire system. The emulation enables efficient, early power/latency analysis to be performed. Thus, the combination of user behavior/intent modeling via traces together with ability to emulate the perceptual computing system via these traces provides the basis for enabling early perceptual computing system engineering/design.

In embodiments, the disclosure provides:
Ability to represent usage models of interest based on statistics of user behavior capturing the events of interest for perceptual computing (e.g., gestures, gaze, and so forth), with outputs including, but are note limited to, definition of usage models in terms of user event/behavior statistics.

Ability to generate traces capturing relevant events representing user behavior/intent satisfying the usage model statistics, with outputs including, but are not limited to, reference traces of user event/behavior overtime.

Ability to power/performance emulate the system via user event trace, with outputs including, but are not limited to, system traces of user events recognized.

In embodiments, analysis/viewing capabilities for power/latency estimations via post-processing of the traces may also be provided.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation, Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations, In various embodiments, illustrated and/or described operations, entities, data, and/or modules may be merged, broken into further sub-parts, and/or omitted.

The phrase "in one embodiment" or "in an embodiment" is used repeatedly, The phrase generally does not refer to the same embodiment; however, it may. The terms "comprising," "having," and "including" are synonymous, unless the context dictates otherwise. The phrase "A/B" means "A or B", The phrase "A and/or B" means "(A), (B), or (A and B)". The phrase "at least one of A, B and C" means "(A), (B), (C), (A and B), (A and C), (B and C) or (A, B and C)".

FIG. 1 illustrates an overview of an arrangement associated with designing/engineering perceptual computing systems that includes user intent modeling, in accordance with various embodiments of the present disclosure. As illustrated, arrangement 100 may include trace generator 108 and perceptual computing system emulator 112, coupled to one another as shown. As will be described in more details below, collectively, generator 108 and emulator 112 may be configured to enable early evaluation of performance of a perceptual computing system while the system is being designed and/or engineered, that includes user intent modeling, thereby potentially improving the efficiency of design/engineering, and the effectiveness of the resulting perceptual computing system.

In various embodiments, trace generator 108 may be configured to receive one or more usage models 104 as inputs, and in response, generate a number of traces 110 of user events/behaviors for a period of time, that may form a workload, for input into emulator 112. In embodiments, trace generator 108 may be further configured to receive a number of trace format definitions 106, and generate traces 110 in the defined trace formats.

In various embodiments, usage models 104 may be created based at least in part on one or more usage studies 102. In embodiments, usage models 104 may include user event/behavior statistics. For these embodiments, traces 110 may be generated based at least in part on these user event/behavior statistics. For example, a web browser usage model created based at least in part on one or more web browsing usage studies that include user web browsing event/behavior statistics may be as follows:

50% User Present (in vicinity of computer)=User Active
75% User Active=Web Browsing Active & In Focus
50% Web Browsing Active & Focus=Hand Poses
40% Hand Poses during Web Browsing are realized to User Gestures In various embodiments, trace format definitions 106 may include a trace format for user gestures, user gazes and/or user speeches. A user gesture trace format may include a type of a user gesture, a start time of the user gesture and the end time of the user gesture. User gestures may include e.g., but not limited to, right hand wave, left hand wave, right hand pinch, left hand pinch, right hand scroll down, left hand scroll down, right hand select, left hand select, and so forth. A user gaze trace format may include the (x, y, z) coordinates of a user gaze. A user speech trace format may include a textual field for the words of an uttered speech.

Still referring to FIG. 1, emulator 112 may include runtime manager 114, a number of hardware/software component models 116 and a number of modality algorithms 118, coupled to one another other as shown. In embodiments, hardware/software component models 116 may model e.g., hut not limited to, power consumption and/or latency of the major hardware and/or software components of the perceptual computing system being designed and/or engineered. Modality algorithms 118 may be configured to recognize various usage modalities (e.g., user gestures) from output data of the various modeled devices of the perceptual computing system. Examples of modality algorithm may include, but are not limited to, hand gestures, facial expressions, gaze, and so forth. Runtime manager 114, in turn, may be configured to generate responses to the workload (represented by traces 110), using models 116 and algorithms 118, as emulation results 120. In embodiments, emulation results 120 may include power consumption and/or latency information associated with the various hardware/software components of the perceptual computing system processing the workload. Accordingly, analysis of emulation results 120 may enable assessment of the power consumption and/or latency of the perceptual computing system.

In various embodiments, hardware and/or software components of the perceptual computing system modeled may include, but are not limited to, gesture recognition software modules, 3D camera sensors, and so forth. In embodiments, hardware/software component models 116 may be abstract models or protocols expressed in C++/SystemC, In various embodiments, hardware/software component models 116, and/or modality algorithms 118 may be provided to and received by runtime manager 114, from designers and/or engineers of the perceptual computing system.

Figure 2:
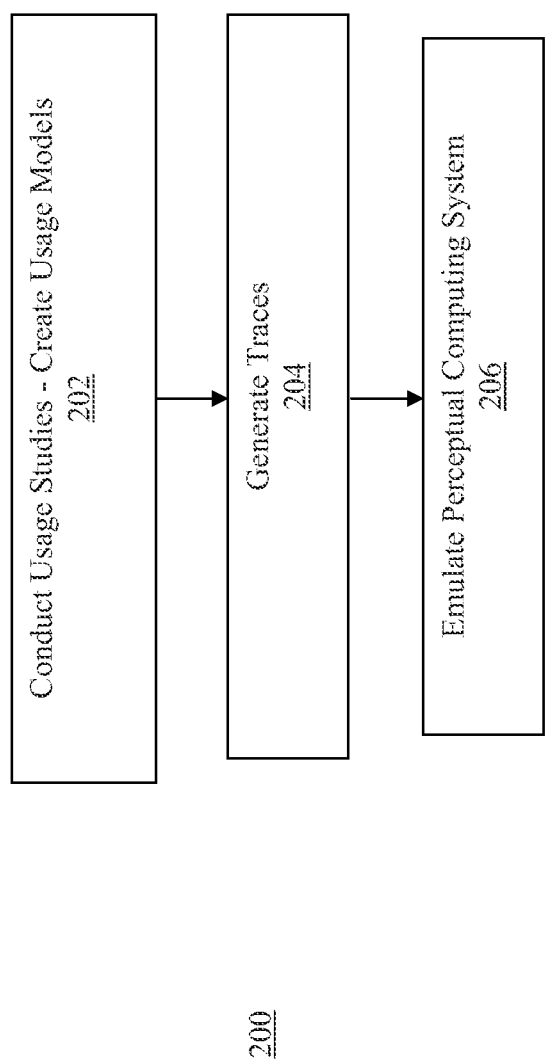
FIG. 2 illustrates a method associated with designing/engineering perceptual computing systems that includes user intent modeling.

Referring now to FIG. 2, wherein a method associated with designing/engineering perceptual computing systems that includes user intent modeling, in accordance with various embodiments of the present disclosure, is illustrated. As shown, method 200 may start at block 202. At block 202, one or more usage models that include user event/behavior statistics may be created. As described earlier, the usage model(s) may be created based on various usage studies.

From block 202, method 200 may proceed to block 204. At block 204, various traces of user events/behaviors for a period of time, forming a workload, suitable for input into an emulator to emulate a perceptual computing system being designed/engineered may be generated. As described earlier, the traces my be generated in accordance with the user event/behavior statistics of the usage model(s). Further, the traces may be generated in accordance with a number of predefined trace formats.

From block 204, method 200 may proceed to block 206. At block 206, processing of the workload (represented by the generated traces) by the perceptual computing system being designed/engineered may be emulated. The emulation may be conducted using an emulator having e.g., models of the major hardware/software components of the perceptual computing system, and usage modality algorithms, As earlier described, the models of the major hardware/software components may include power consumption and/or latency behaviors of the modeled hardware/software components. The usage modality algorithms may identify usage modality from output data of the modeled devices. Usage modality may include for examples, but not limited to, user gestures, facial expressions, gazes and so forth.

Additionally, in embodiments, at block 204, the emulation results may be analyzed to determine the performance of the perceptual computing system being designed/engineered, including e.g., but not limited to, the power consumption and/or latency of the various major hardware/software components of the perceptual computing system. The analysis may include comparison of the responses to the generated traces inputted.

Figure 3:
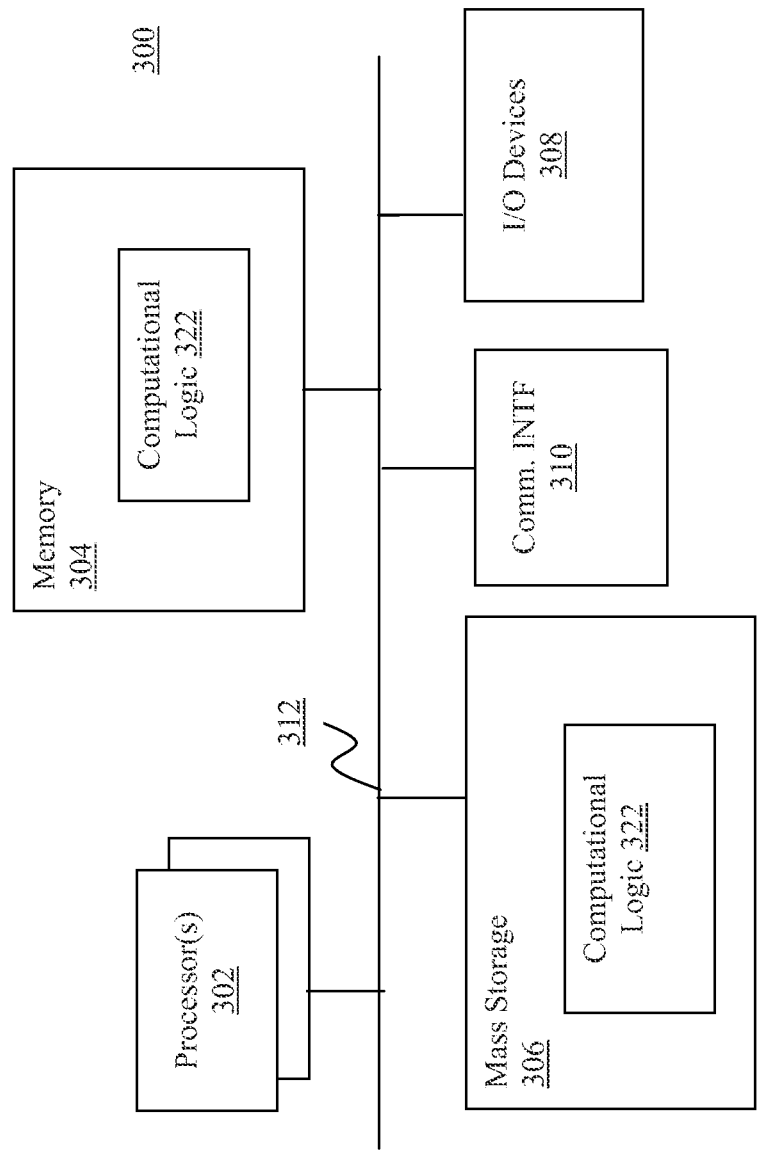
FIG. 3 illustrates an example computer suitable for use for the arrangement of FIGS. 1.

Referring now to FIG. 3, wherein an example computer suitable for use for the arrangement of FIG. 1, in accordance with various embodiments, is illustrated. As shown, computer 300 may include a number of processors or processor cores 402, and system memory 304. For the purpose of this application, including the claims, the terms "processor" and. "processor cores" may be considered synonymous, unless the context clearly requires otherwise. Additionally, computer 300 may includes mass storage devices 306 (such as diskette, hard drive, compact disc read only memory (CDROM) and so forth), input/output devices 308 (such as display, keyboard, cursor control and so forth) and communication interfaces 310 (such as network interface cards, modems and so forth). The elements may be coupled to each other via system bus 312, which may represent one or more buses. In the case of multiple buses, they may be bridged by one or more bus bridges (not shown).

Each of these elements may perform its conventional functions known in the art. In particular, system memory 304 and mass storage 306 may be employed to store a working copy and a permanent copy of the programming instructions implementing the various elements, such as trace generator 108, emulator 112 (or portion thereof), and so forth, The various elements may be implemented by assembler instructions supported by processor(s) 302 or high-level languages, such as, for example, C, that can be compiled into such instructions.

The permanent copy of the programming instructions may be placed into permanent storage 306 in the factory, or in the field, through, for example, a distribution medium (not shown), such as a compact disc (CD), or through communication interface 310 (from a distribution server (not shown)). That is, one or more distribution media having an implementation of the agent program may be employed to distribute the agent and program various computing devices.

The constitution of these elements 302-312 are known, and accordingly will not be further described.

FIG. 4 illustrates an example non-transitory computer-readable storage medium having instructions configured to practice all or selected aspects of the method of FIG. 2; in accordance with various embodiments of the present disclosure. As illustrated, non-transitory computer-readable storage medium 402 may include a number of programming instructions 404. Programming instructions 404 may be configured to enable a device, e.g., computer 300, in response to execution of the programming instructions, to perform various operations of method 200 of FIG. 2, e.g., but not limited to, trace generation, emulation, and so forth. In alternate embodiments, programming instructions 304 may be disposed on multiple non-transitory computer-readable storage media 302 instead.

Referring back to FIG. 3, for one embodiment, at least one of processors 302 may be packaged together with computational logic 322 configured to practice aspects of the method of FIG. 2. For one embodiment, at least one of processors 302 may be packaged together with computational logic 322 configured to practice aspects of the method of FIG. 2 to form a System in Package (SiP), For one embodiment, at least one of processors 302 may be integrated on the same die with computational logic 322 configured to practice aspects of the method of FIG. 2, For one embodiment, at least one of processors 302 may be packaged together with computational logic 322 configured to practice aspects of the method of FIG. 2 to form a System on Chip (SoC). For at least one embodiment, the SoC may be utilized in e.g., but not limited to, a computing tablet.

Thus, at least one non-transitory computer-readable storage medium having a plurality of instructions configured to enable a computing device, in response to execution of the instructions by the computing device, to receive a usage model having a plurality of user event/behavior statistics, have been described. In response to execution, the instructions may further enable the computing device to generate and output a plurality of traces of user events/behaviors over a period of time, based at least in part on the user event/behavior statistics, to form a workload for input into an emulator configured to emulate a perceptual computing system. The user event/behavior statistics may include user event/behavior statistics for user gestures or user gazes.

In response to execution, the instructions may further enable the computing device to receive a plurality of trace formats for the traces to be generated, wherein the generate operation may include generate the plurality of traces in the trace formats. The trace formats may include a format for a gesture trace that includes a type of a gesture, a start time of the gesture and an end time of the gesture, a format for a gaze trace that includes a plurality of coordinates associated with a gaze, or a format for a speech trace that includes a plurality of words.

In response to execution, the instructions may further enable the computing device to implement a runtime manager of the emulator. The emulator may be configured to receive a plurality of component models of the perceptual computing system; receive a plurality of usage modality algorithms; and generate and output emulated responses of the perceptual computing system to the workload, using the component models and the usage modality algorithms.

The component models may specify power consumption or latency behaviors of corresponding hardware or software components of the perceptual computing system. The emulated responses may include corresponding power consumption or latency information of the hardware or software components of the perceptual computing system associated with processing the workload.

In embodiments, a method may include receiving, by a computing device, a usage model having a plurality of user event/behavior statistics; and generating and outputting, by the computing device, a plurality of traces of user events/behaviors over a period of time, based at least in part on the user event/behavior statistics, to form a workload for input into an emulator configured to emulate a perceptual computing system. The user event/behavior statistics may include user event/behavior statistics for user gestures or user gazes.

The method may further include receiving, by the computing device, a plurality of trace formats for the traces to be generated, and wherein the generating and outputting may include generating and outputting the plurality of traces in the trace formats. As described earlier, the trace formats may include a format Dora gesture trace that includes a type of a gesture, a start time of the gesture and an end time of the gesture, a format for a gaze trace that includes a plurality of coordinates associated with a. gaze, or a format for a speech trace that includes a plurality of words.

In embodiments, the method may further include receiving, by the computing device, a plurality of component models of the perceptual computing system; receiving, by the computing device, a plurality of usage modality algorithms; and generating and outputting, by the computing device, emulated responses of the perceptual computing system to the workload, using the component models and the usage modality algorithms. The component models specify power consumption or latency behaviors of corresponding hardware or software components of the perceptual computing system, and wherein the emulated responses include corresponding power consumption or latency information of the hardware or software components of the perceptual computing system associated with processing the workload.

In embodiments, an apparatus may include a processor; and a trace generator configured to be operated by the processor to practice any one of the described trace generation methods. In embodiments, an apparatus may include a processor, and an emulator runtime manager configured to be operated by the processor to practice any one of the described emulation methods.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the

What is claimed is:

1. At least one non-transitory computer-readable storage medium having a plurality of instructions to enable a computing device, in response to execution of the instructions by the computing device, to:
   receive a usage model having a plurality of user event/behavior statistics;
   generate a plurality of traces of user events/behaviors over a period of time, based at least in part of the on the user event/behavior statistics of the usage model,
   form a workload from the plurality of traces for input into an emulator that emulates a perceptual computing system; and output the workload to the emulator to enable evaluation of performance of the perceptual computing system based on the workload;
wherein the emulator emulates the perceptual computing system;
wherein evaluation of performance includes evaluation of power consumption or latency of hardware components of the perceptual computing system;
wherein for evaluation of performance, the emulator is to receive a plurality of component models of the perceptual computing system that specify power consumption or latency behaviors of corresponding hardware or software components of the perceptual computing system;
wherein the emulator is to further receive a plurality of usage modality algorithms to recognize usage modalities from output data of the component models; and
generate and output emulated responses of the perceptual computing system to the workload, using the component models and the usage modality algorithms; and
wherein the emulated responses include corresponding power consumption or latency information of the hardware or software components of the perceptual computing system associated with processing the workload.

2. The at least one computer-readable storage medium of claim 1, wherein the user event/behavior statistics comprise user event/behavior statistics for user gestures or user gazes.

3. The at least one computer-readable storage medium of claim 1, wherein the instructions are to further enable the computing device, in response to execution of the instructions by the computing device, to receive a plurality of trace formats for the traces to be generated, and wherein said generate comprises generate the plurality of traces in accordance with the trace formats.

4. The at least one computer-readable storage medium of claim 3, wherein the trace formats comprise a format for a gesture trace that includes a type of a gesture, a start time of the gesture and an end time of the gesture.

5. The at least one computer-readable storage medium of claim 3, wherein the trace formats comprise a format for a gaze trace that includes a plurality of coordinates associated with a gaze.

6. The at least one computer-readable storage medium of claim 3, wherein the trace formats comprise a format for a speech trace that includes a plurality of words.

7. The at least one computer-readable storage medium of claim 1, wherein the instructions are to further enable the computing device, in response to execution of the instructions by the computing device, to implement a runtime manager of the emulator.

8. At least one non-transitory computer-readable storage medium having a plurality of instructions to provide to a computing device, in response to execution of the instructions by the computing device, an emulator to emulate a perceptual computing system, wherein the emulator is to:
receive a plurality of component models of the perceptual computing system, whereinindividual component models, of the plurality of component models, model hardware or software components of the perceptual computing system;
receive a plurality of usage modality algorithms to recognize usage modalities from output data of the plurality of component models; and
generate and output emulated responses of the perceptual computing system to a workload, using the component models and the usage modality algorithms to evaluate performance of the perceptual computing system;
wherein evaluation of performance includes evaluation of power consumption or latency of hardware components of the perceptual computing system.

9. The at least one computer-readable storage medium of claim 8, wherein the component models specify power consumption or latency behaviors of corresponding hardware or software components of the perceptual computing system, and wherein the emulated responses include corresponding power consumption or latency information of the hardware or software components of the perceptual computing system associated with processing the workload.

10. The at least one computer-readable storage medium of claims 8, wherein the workload comprises a plurality of traces of user events/behaviors generated based at least in part on a usage model having a plurality of user event/behavior statistics.

11. A method comprising:
receiving, by a computing device, a usage model having a plurality of user event/behavior statistics;
generating, by the computing device, a plurality of traces of user events/behaviors over a period of time, based at least in part on the user event/behavior statistics of the usage model;
forming a workload from the plurality of traces for input into an emulator that emulates a perceptual computing system; and
outputting the workload to the emulator to evaluate performance of the perceptual computing system based on the workload;
wherein evaluation of performance includes evaluation of power consumption or latency of hardware components of the perceptual computing system;
wherein for evaluation of performance, the emulator is to receive a plurality of component models of the perceptual computing system that specify power consumption or latency behaviors of corresponding hardware or software components of the perceptual computing system;
wherein receiving, by the emulator, a plurality of usage modality algorithms to recognize usage modalities from output data of the component models; and
generating and outputting, by the computing device, emulated responses of the perceptual computing system to the workload, using the component models and the usage modality algorithms, to emulate the perceptual computing system; and
wherein outputting comprises outputting emulated responses that include corresponding power consumption or latency information of the hardware or software components of the perceptual computing system associated with processing the workload.

12. The method of claim 11, wherein the user event/behavior statistics comprise user event/behavior statistics for user gestures or user gazes.

13. The method of claim 11, further comprising receiving, by the computing device, a plurality of trace formats for the traces to be generated, and wherein said generating and outputting comprises generating and outputting the plurality of traces in accordance with the trace formats.

14. The method of claim 13, wherein the trace formats comprise a format for a gesture trace that includes a type of a gesture, a start time of the gesture and an end time of the gesture, a format for a gaze trace that includes a plurality of coordinates associated with a gaze, or a format for a speech trace that includes a plurality of words.

15. A method comprising:
receiving, by an emulator on a computing device, a plurality of component models of a perceptual computing system, wherein individual component models, of the plurality of component models, model hardware or software components of the perceptual computing system;

receiving, by the emulator, a plurality of usage modality algorithms to recognize usage modalities from output data component models; and generating and outputting, by the emulator, emulated responses of the perceptual computing system to a workload, using the component models and the usage modality algorithms, to emulate and evaluate the perceptual computing system; wherein evaluation of performance includes evaluation of power consumption or latency of components of hardware components the perceptual computing system.

16. The method of claim 15, wherein the component models specify power consumption or latency behaviors of corresponding hardware or software components of the perceptual computing system, and wherein the emulated responses include corresponding power consumption or latency information of the hardware or software components of the perceptual computing system associated with processing the workload.

17. The method of claim 15, wherein the workload comprises a plurality of traces of user events/behaviors generated based at least in part on a usage model having a plurality of user event/behavior statistics.

18. An apparatus comprising:
a processor; and
a trace generator to be operated by the processor to practice the method of claim 11.

19. An apparatus comprising:
a processor; and
an emulator runtime manager to be operated by the processor to practice the method of claim 15.

* * * * *